United States Patent
Yu et al.

(10) Patent No.: US 9,552,078 B2
(45) Date of Patent: Jan. 24, 2017

(54) SAFETY NAVIGATION DEVICE AND AN EXECUTING METHOD THEREOF

(71) Applicant: WALTON ADVANCED ENGINEERING INC., Kaohsiung (TW)

(72) Inventors: Hong-Chi Yu, Kaohsiung (TW); Mao-Ting Chang, Kaohsiung (TW)

(73) Assignee: WALTON ADVANCED ENGINEERING INC., Kaohsiung (TW)

( * ) Notice: Subject to any disclaimer, the term of this patent is extended or adjusted under 35 U.S.C. 154(b) by 337 days.

(21) Appl. No.: 14/168,421

(22) Filed: Jan. 30, 2014

(65) Prior Publication Data

US 2015/0134852 A1    May 14, 2015

(30) Foreign Application Priority Data

Nov. 12, 2013 (TW) .............................. 102141096 A

(51) Int. Cl.

| G06F 3/02 | (2006.01) |
|---|---|
| G06F 21/57 | (2013.01) |
| H04L 29/06 | (2006.01) |
| G06F 21/72 | (2013.01) |
| H04L 29/12 | (2006.01) |

(52) U.S. Cl.
CPC ............ *G06F 3/0219* (2013.01); *G06F 21/575* (2013.01); *G06F 21/725* (2013.01); *H04L 63/08* (2013.01); *H04L 63/0853* (2013.01); *H04L 63/10* (2013.01); *G06F 2221/2119* (2013.01); *G06F 2221/2153* (2013.01); *H04L 61/30* (2013.01)

(58) Field of Classification Search
CPC .... G06F 3/0219; G06F 21/575; G06F 21/725; G06F 2221/2119; G06F 2221/2153; H04L 63/08; H04L 63/0853; H04L 63/10; H04L 61/30
See application file for complete search history.

(56) References Cited

U.S. PATENT DOCUMENTS

| 8,434,139 | B1 * | 4/2013 | Ortiz, Jr. | ............... H04L 63/029 709/227 |
|---|---|---|---|---|
| 2011/0014948 | A1 * | 1/2011 | Yeh | ..................... G06Q 20/3278 455/558 |
| 2011/0258326 | A1 * | 10/2011 | Hu | ........................ H04L 63/062 709/226 |
| 2012/0096207 | A1 * | 4/2012 | Chen | ..................... G06F 13/122 710/303 |
| 2012/0173603 | A1 * | 7/2012 | Okamoto | ................ H04L 67/34 709/201 |
| 2013/0318261 | A1 * | 11/2013 | Cheng | .................. G06F 13/385 710/62 |

* cited by examiner

*Primary Examiner* — Viet Vu
(74) *Attorney, Agent, or Firm* — Bacon & Thomas, PLLC

(57) ABSTRACT

A safety navigation device and an executing method thereof in the present disclosure are based on an integrated circuit module and a server for safety certification. According to an algorithm or instantaneous time, the integrated circuit module which is electrically connected to electronic equipment creates an IP address, controlling the electronic equipment to enable the IP address via a virtual keypad. Then, the dominating server in which a certification mechanism is installed will check validity of the IP address and issues corresponding information.

9 Claims, 8 Drawing Sheets

SAFETY NAVIGATION DEVICE AND AN EXECUTING METHOD THEREOF

BACKGROUND OF THE INVENTION

1) Field of the Invention

The present disclosure relates to a navigation device and an executing method thereof, particularly a device and an executing method thereof based on an algorithm or instantaneous time to generate an IP address.

2) Description of the Prior Art

The electronics have become tools to get real-time information in this IT era, for example, desktop computers, notebook computers, hand-held tablet computers and smart mobile phones, all of which are capable of catching Internet information for users.

A user usually gets Internet information through a software interface or a browser in which an IP address is mostly derived from a search engine. In the other hand, a user has more changes to receive IP addresses such as an IP address for on-sale information and a lengthy IP address from other channels while running the above equipment. Currently, an IP address can be provided by an addresser based on an URL (Uniform Resource Locator), a shortened URL or an "OR" code: an URL, which is lengthy or misspelled, is seldom considered; a shortened URL better than a complete URL avoids misspelling; an "OR" code recording information in icons which can be scanned by a scanner is a popular convenient method to get an IP address.

The patents for navigation methods are shown as follows.

Patent No. TW 1329447 discloses a text transmission system based on WAP PUSH and a method thereof. The text messages initiatively sent to a user's mobile phone supporting the WAP PUSH function by the text transmission system include texts and a WAP URL through which a user links a WAP server by the GPRS protocol in the mobile phone and browses complete messages. In order to conveniently and effectively provide text message services, the invention based on the GPRS network rather than mobile phones or web pages for transmission of text messages sends a text message to a user for browsing complete texts without troubles like spam and supplies diversified value-added mobile communications services for a WAP cell phone.

Patent No. TW 1256825 discloses a fast cell-phone Internet accessing service and an operating method thereof In the fast cell-phone Internet accessing service, Internet is immediately available to a mobile phone user, who enters an IP address through numeric keys and clicks on the Internet accessing button, for promotional service efficiency of mobile Internet via a mobile phone. The intention is characteristic of pre-stored character strings for automatic links, for example, prefix, center or postfix character strings in a web address, by which a user can enter a web address and access a website rapidly.

Patent No. TW 479431 discloses a scanner directly linking a website and a method thereof. Based on a "one touch" operation, the invention is used to upload scanned images into a website and edit the website or the images when a "one touch" control command is entered into a user's scanner and a computer system connected to the scanner links a specific website. Moreover, the user can upload images scanned by the scanner to the website through the "one touch" operation. Before uploading scanned images, the user is able to check or change the website's IP address.

Patent No. TW 507130 discloses a method for website connection and a system thereof The invention used in linking a client computer to World Wide Web (WWW) is to provide a database in the network connection system with telephone-like website data such as a country code, an area code and a phone number corresponding to an IP address. When an IP address to be linked is entered via a homepage on a browser or a network connection system, a search for the IP address is activated in a database to list the IP address, at least one similar IP address, or no IP address for a user. Next, the client computer may link the website, display other options including similar information for the user, or ask the user to enter a new IP address again.

However, the above patented technologies with purposes of improving how to enter an IP address and display contents with respect to the IP address still have some problems such as support equipment to process QR codes and security of keeping an effective link.

Accordingly, a safety navigation device and an executing method thereof in the present disclosure are intended to correct the above problems.

SUMMARY OF THE INVENTION

In the present disclosure, a safety navigation device and an executing method thereof for safety certification are based on an integrated circuit module and a server. According to an algorithm or instantaneous time, the integrated circuit module which is electrically connected to electronic equipment creates an IP address, controlling the electronic equipment to enable the IP address via a virtual keypad. Then, the dominating server in which a certification mechanism is installed will check validity of the IP address and issues corresponding information.

The object of the present disclosure is to provide a safety navigation device and an executing method thereof which are effective in safety navigation validated with an algorithm and a server.

The other object of the present disclosure is to provide a safety navigation device and an executing method thereof by a server and time elements making cryptanalysis difficult for certification.

The further object of the present disclosure is to provide a safety navigation device and an executing method thereof in which a radio-based timer is installed for precise timing and safety protection.

The yet other object of the present disclosure is to provide a safety navigation device and an executing method thereof in which popular USBs are installed for universality.

The yet further object of the present disclosure is to provide a safety navigation device and an executing method thereof which depend on a server's data logging to prevent an identical IP address from reuse.

The yet still other object of the present disclosure is to provide a safety navigation device and an executing method thereof by which a server will set up time as a determinant attribute for information change and an improved reuse rate.

The yet still further object of the present disclosure is to provide a safety navigation device and an executing method thereof which depend on a characteristic of reuse for reduced purchase costs.

A safety navigation device in the present disclosure relies on the following technical measures to realize the above purposes. The safety navigation device comprises an integrated circuit module with a memory chip, a control element, an interconnection interface and a serial generation unit, all of which are electrically connected to each other via a substrate; the substrate develops two surfaces, that is, an outer surface for installation of the interconnection interface and an inner surface for installation of other components; the safety navigation device has features as follows: the interconnection interface is inserted into a slot on equipment; the control element depends on a human interface device module under a keypad mode to be electrically connected to the equipment; the serial generation unit creates an IP address; the control element issues a signal for entering the IP address from an automated key-in module to the equipment; the equipment links a website corresponding to the IP address; a certification unit in a server dominating the IP address reads relevant information of corresponding data in the server and sends the information to the equipment.

The safety navigation device further relies on the following technical measure to realize the above purposes.

In the safety navigation device, the serial generation unit comprises an algorithm element.

In the safety navigation device, the memory chip comprises a default IP address and an arithmetic formula.

In the safety navigation device, the serial generation unit comprises a radio-based timer unit.

In the safety navigation device, the integrated circuit module comprises a time corrector unit and an electrical storage unit.

In the present disclosure, an executing method of a safety navigation device comprises steps as follows: Step 1: an interconnection interface of an integrated circuit module is inserted into a slot of equipment; Step 2: the integrated circuit module and the equipment are electrically connected to each other; Step 3: a human interface device module of a control element in the integrated circuit module makes a request to a computer for linking a human interface device (HID); Step 4: an IP address is generated by a serial generation unit of the integrated circuit module; Step 5: an automated key-in module in the control element issues one command to activate a specific browser; Step 6: the automated key-in module enters the IP address and links a website corresponding to the IP address; Step 7: a server dominating the IP address depends on a certification unit to read corresponding data of the IP address and respond the equipment with relevant information.

The executing method of a safety navigation device further relies on the following technical measure to realize the above purposes.

In the executing method of a safety navigation device, a time corrector unit in the integrated circuit module can be pushed and pressed before Step 1 for time calibration of a radio-based timer unit.

In the executing method of a safety navigation device, the IP address is created with a default IP address in a memory chip followed by a serial number, which is generated by an arithmetic formula in the serial generation unit and read by an algorithm element in the serial generation unit, in Step 4.

In the executing method of a safety navigation device, the IP address is created with a default IP address in a memory chip followed by a time-based serial number, which is generated by an arithmetic formula as well as the radio-based timer unit and read by an algorithm element in the serial generation unit, in Step 4.

In the executing method of a safety navigation device, the automated key-in module issues a specific key-in command in order to make the specific browser's address bar available after Step 5.

In the executing method of a safety navigation device, the content with respect to the IP address which has been recorded in the server in Step 7 according to data logging but not activated repeatedly is displayed.

In the executing method of a safety navigation device, the content with respect to the IP address whose session length matches a time test mechanism in the certification unit in Step 7 is displayed.

In the executing method of a safety navigation device, the server in Step 7 offers the corresponding data referring to the session length.

In the executing method of a safety navigation device, the server in Step 7 offers the corresponding data referring to time information of the IP address.

In contrast to a conventional technique, a safety navigation device and an executing method thereof in the present disclosure are effective in: (1) a single device facilitating multiple functions; (2) an IP Address unavailable for safety protection; (3) high usability of single equipment based on popular interfaces.

BRIEF DESCRIPTIONS OF THE DRAWINGS

DETAILED DESCRIPTIONS OF THE PREFERRED EMBODIMENTS

The purposes, features and effects of a safety navigation device are particularly disclosed in the preferred embodiments as follows.

Figure 1:
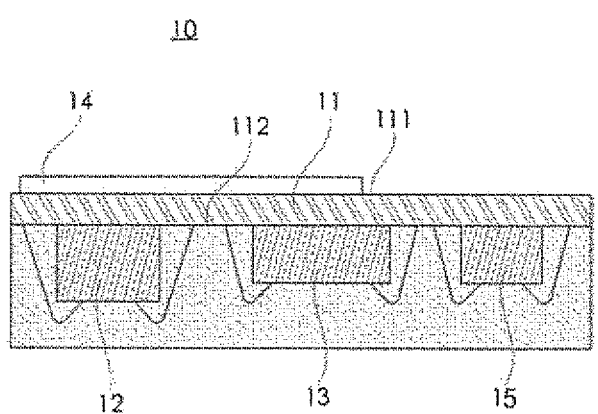
FIG. 1 is a sectional view illustrating a safety navigation device in a preferred embodiment.
Figure 2:
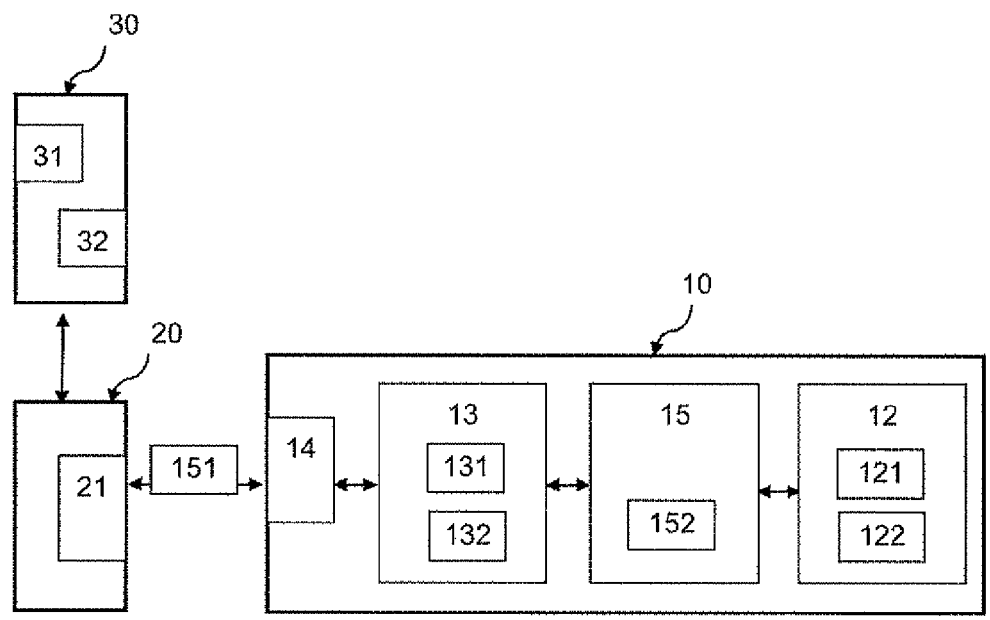
FIG. 2 is a schematic view illustrating a safety navigation device in the first embodiment.
Figure 4:
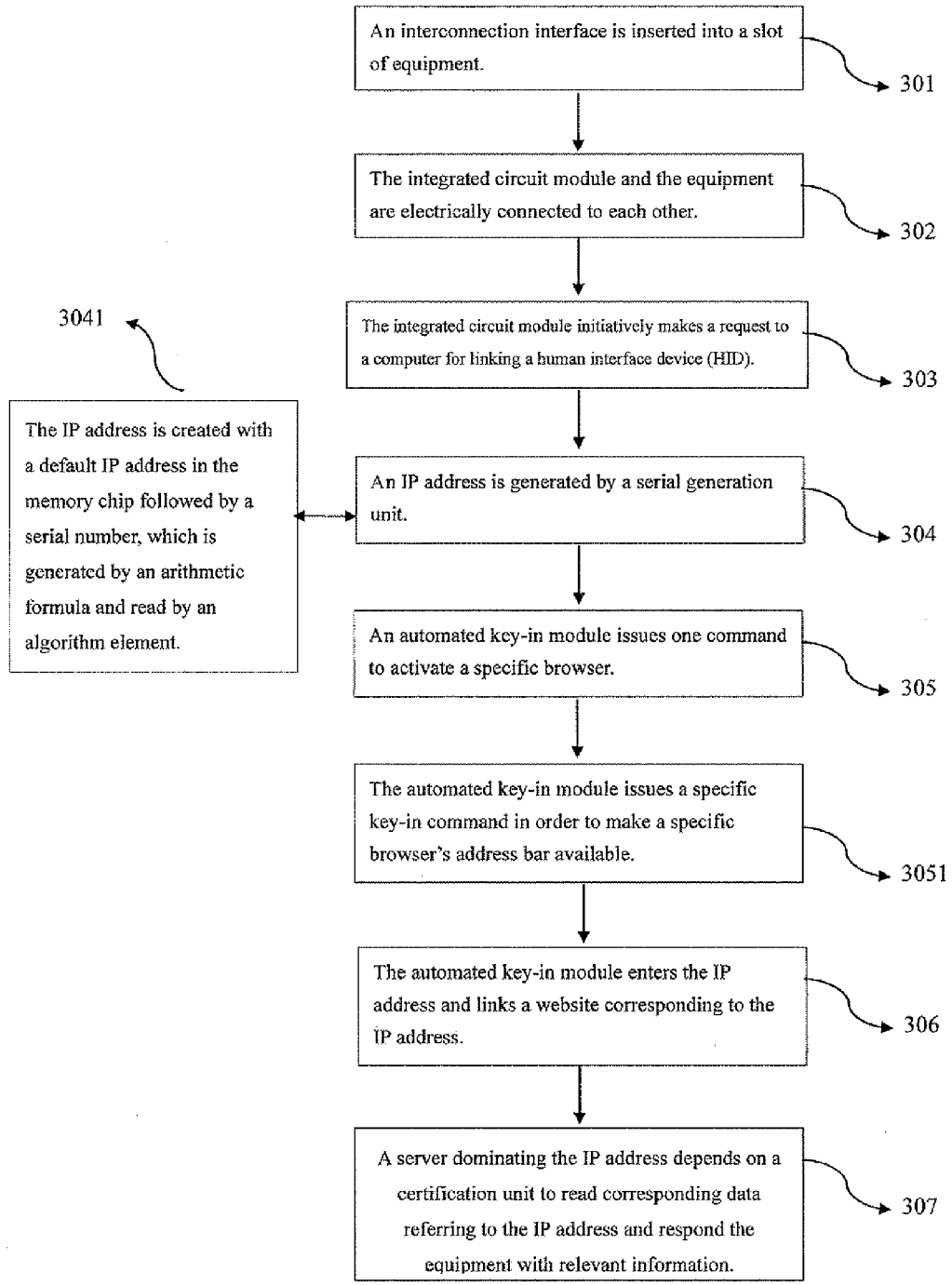
FIG. 4 is a flow diagram illustrating a first executing method of a safety navigation device in the first embodiment.

Please refer to FIGS. 1, 2 and 4 which illustrate a safety navigation device in the first embodiment. As shown in FIG. 1, a safety navigation device in the present disclosure comprises an integrated circuit module (10) on which a substrate (11), a memory chip (12), a control element (13), an interconnection interface (14) and a serial generation unit (15) are installed. The integrated circuit module (10) allows all electronic components to be electronically connected via the substrate (11) which develops both surfaces, an outer surface (111) for installation of the interconnection interface (14) and an inner surface (112) for installation of other electronic components.

As shown in FIG. 2, the memory chip (12) saves a default IP address (121) and an arithmetic formula (122); the control element (13) comprises a human interface device module (131) and an automated key-in module (132); the serial generation unit (15) comprises an algorithm element (152).

Specifically, the substrate (11) is one printed circuit board which is a critical electronic unit or an electronic component carrier providing electrical connections between electronic components; the memory chip (12) is a non-volatile memory which means data saved in the memory will not be erased with power interrupted but accessed with power resumed; the control element (13) is a Universal Serial Bus controller; the interconnection interface (14) is a Universal Serial Bus (USB), which is not only the standard of USB ports between one computer and other peripheral devices but also the technical specification of I/O interfaces extensively applied in various IT and communications products such as PC and mobile device and other fields including cameras, digital TVs (set top boxes), game consoles, etc., and symbolizes universality of the safety navigation device in the present disclosure applicable to different types of equipment; the serial generation unit (15) is a processor, particularly a micro processor (µP) including specific programmable integrated circuits.

Moreover, the default IP address (121) is a default uniform resource locator, for example, http://www.walton.com.tw/; the arithmetic formula (122) is a specific formula which is used in generating a unique discernible string, for example, "xo5XV1P15z6p"; the human interface device module (131) is a USB human interface device which is used in simulating a keypad or a mouse; the automated key-in module (132) is able to issue a specific key-in signal via a keypad; the algorithm element (152) is an arithmetic component.

Please refer to FIGS. 2 and 4 which illustrate execution and operation of a safety navigation device in the present disclosure: FIG. 2 illustrates a safety navigation device in the first embodiment and FIG. 4 illustrates a first executing method of the safety navigation device in the first embodiment. FIGS. 2 and 4 present steps to execute the safety navigation device: an interconnection interface (14) of an integrated circuit module (10) is inserted into a slot (21) of equipment (20) (Step 1: 301); the integrated circuit module (10) and the equipment (20) are electrically connected to each other (Step 2: 302); a human interface device module (131) of a control element (13) in the integrated circuit module (10) under a keypad mode is electrically connected to the equipment (20) (Step 3: 303); an IP address (151) is generated by a serial generation unit (15) (Step 4: 304); the IP address (151) is created with a default IP address (121) in a memory chip (12) followed by a serial number, which is generated by an arithmetic formula (122) and read by an algorithm element (152) in the serial generation unit (15) (Step 4-1: 3041); an automated key-in module (132) in the control element (13) issues one command to activate a specific browser (Step 5: 305); the automated key-in module (132) issues a specific key-in command in order to make the specific browser's address bar available (Step 5-1: 3051); the automated key-in module (132) enters the IP address (151) into the address bar and links a website corresponding to the IP address (151) (Step 6: 306); a server (30) dominating the IP address (151) depends on a certification unit (31) to read corresponding data (32) referring to the IP address (151) and respond the equipment (20) with relevant information (Step 7: 307).

In the above steps, the equipment (20) is an electronic device with USB interfaces; the slot (21) is a USB female slot; the server (30) is computer software/hardware which governs sources, providing users services and comprising a certification unit (31) and corresponding data (32), both of which exist in the form of service and in the form of database, respectively. In addition, some fundamental services are available in the server (30).

Figure 6:
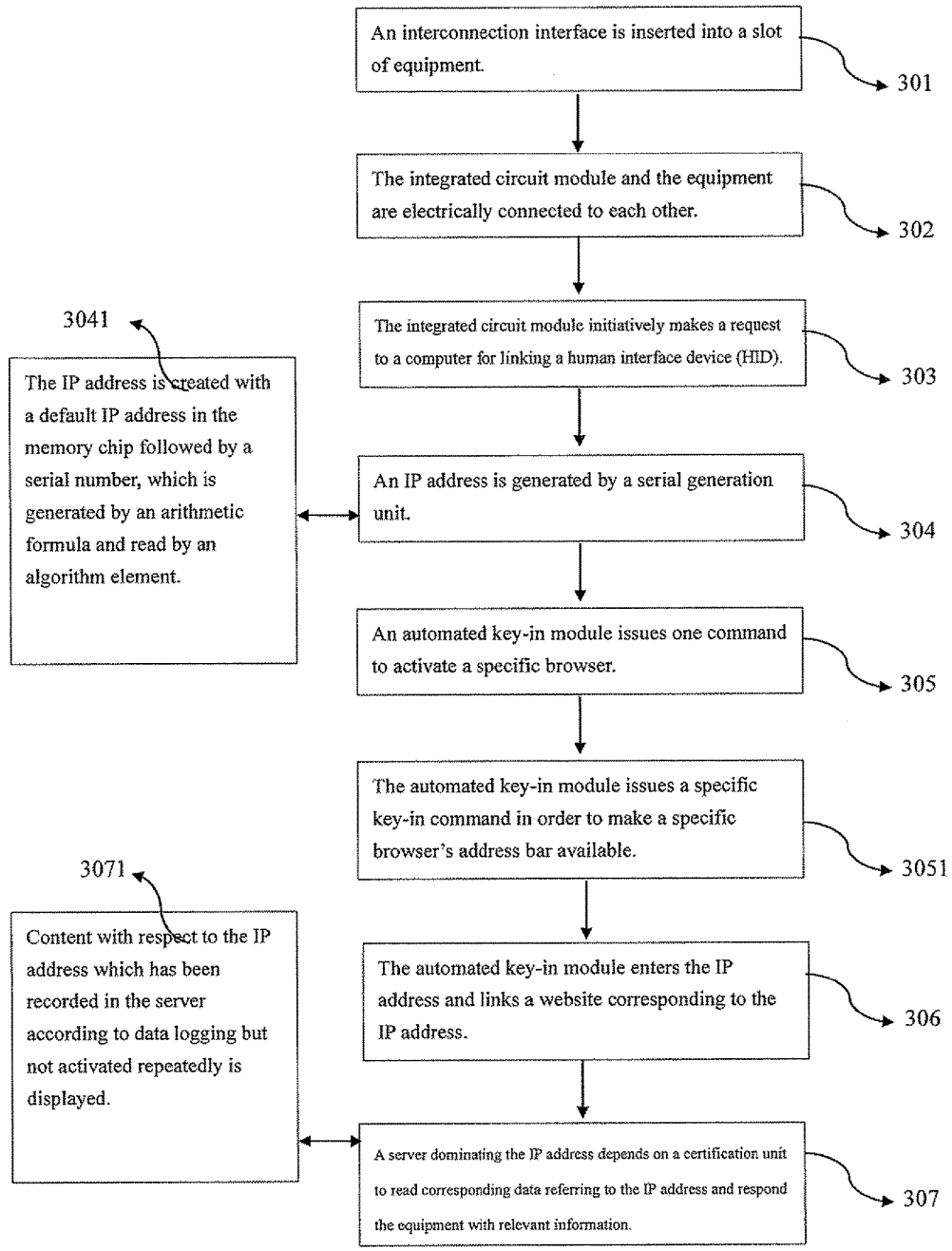
FIG. 6 is a flow diagram illustrating a second executing method of a safety navigation device in the first embodiment.

Please refer to FIG. 6 again. Preferably, the content with respect to the IP address (151), which has been recorded in the server (20) in Step 7 (307) according to data logging but still inactivated, is displayed (Step 7-1: 3071). Step 7-1 is intended to prevent an IP address which has existed and been used from repeated usage.

Figure 8:
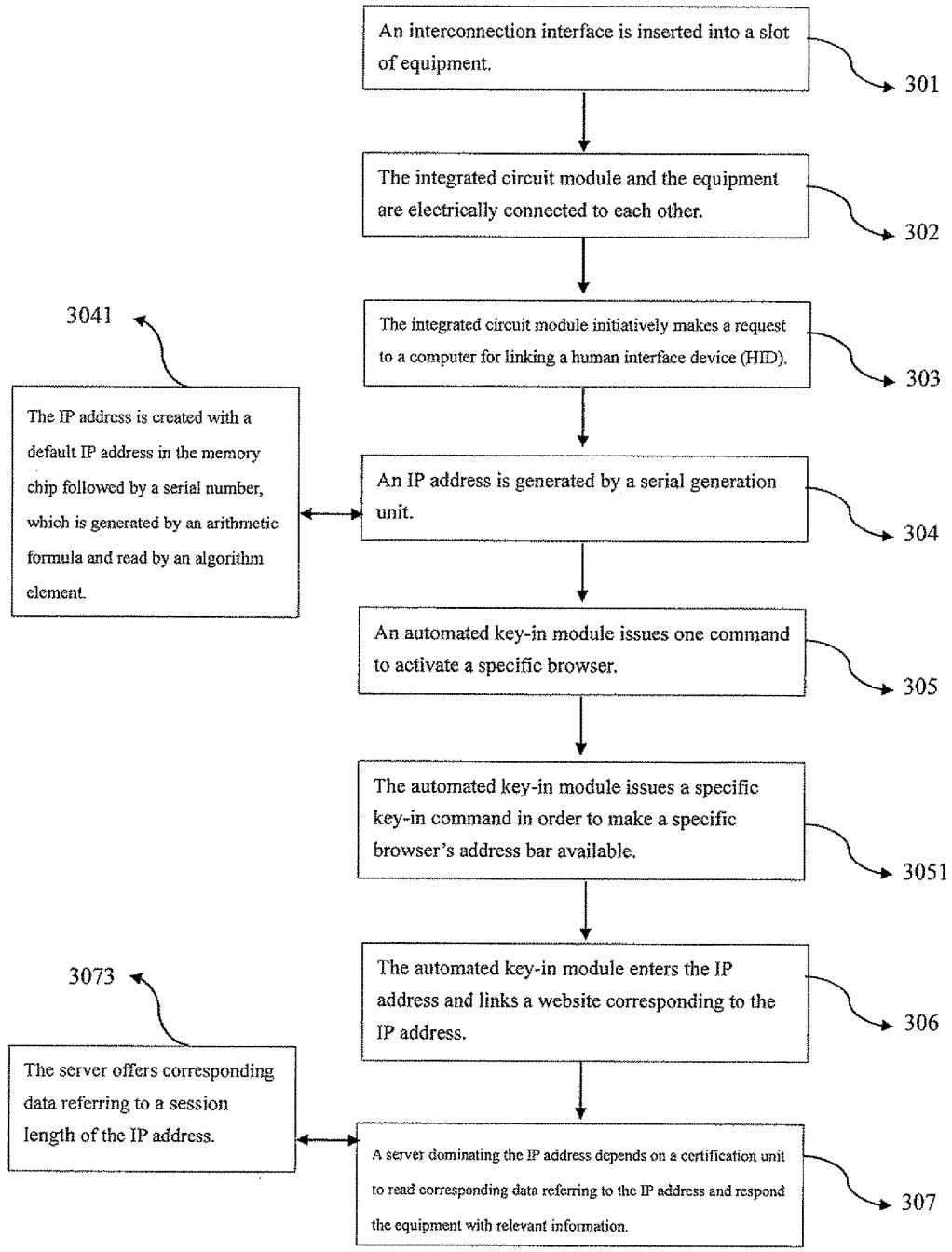
FIG. 8 is a flow diagram illustrating a third executing method of a safety navigation device in the first embodiment.

As shown in FIG. 8, the server (20) in Step 7 (307) offers the corresponding data (32) referring to a session length (Step 7-3: 3073). As such, information displayed by referring to different time conditions provides an end user more values of the safety navigation device, reducing purchase costs.

To avoid repeated descriptions, the components which will be continuously quoted in the second embodiment have the same numbers, definitions and functions as those in the first embodiment. Accordingly, the components in the second embodiment should refer to those in the first embodiment and are not repeatedly explained hereinafter.

Figure 3:
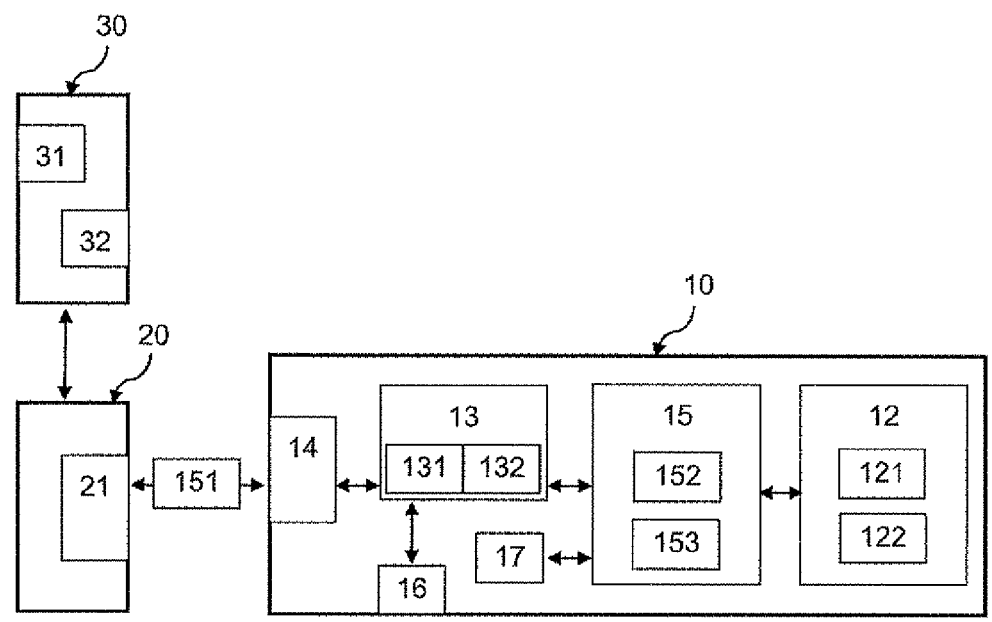
FIG. 3 is a schematic view illustrating a safety navigation device in the second embodiment.
Figure 5:
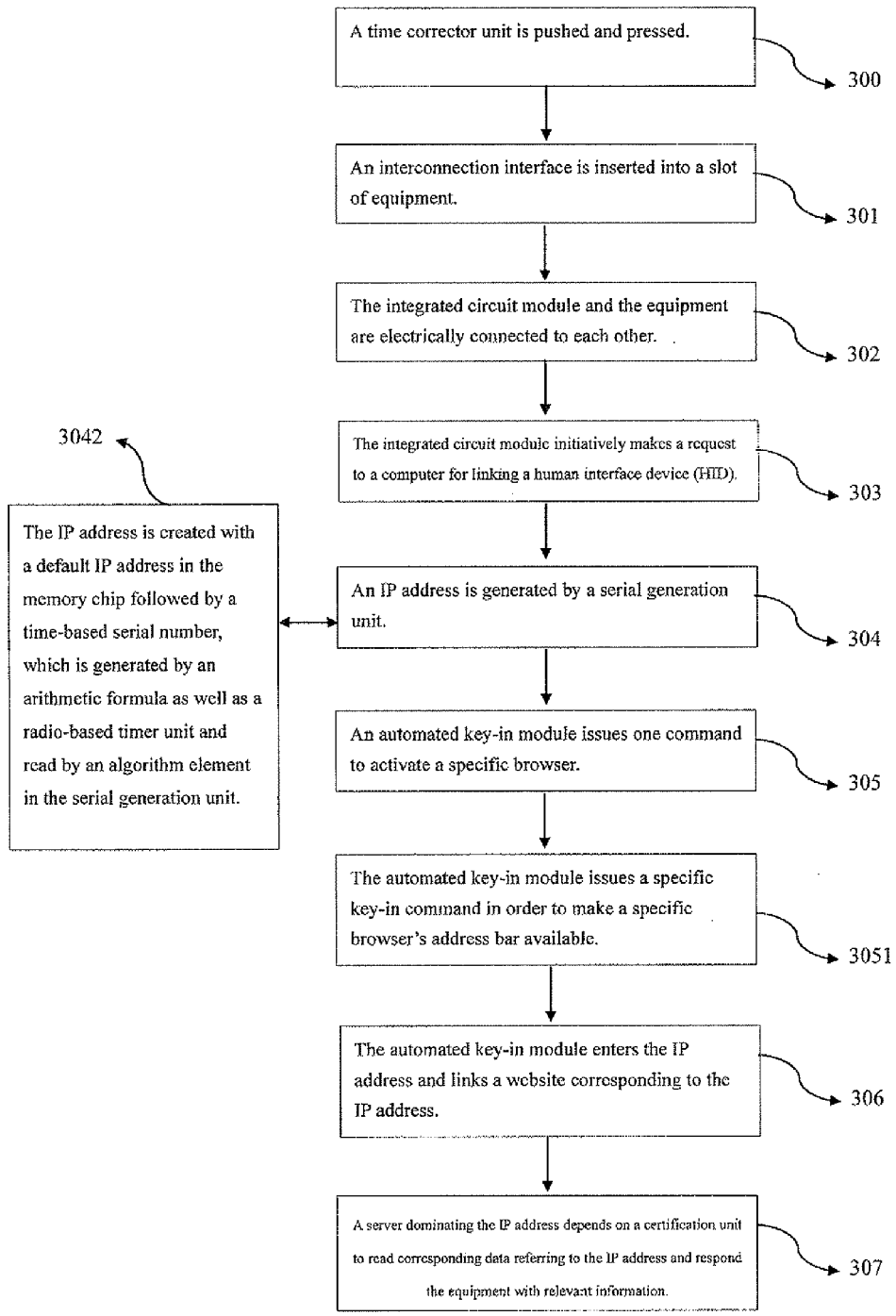
FIG. 5 is a flow diagram illustrating a first executing method of a safety navigation device in the second embodiment.

Please refer to FIGS. 1, 3 and 5 that illustrate the safety navigation device in the second embodiment comprising a radio-based timer unit (153), a time corrector unit (16) and an electrical storage unit (17), all of which are not available in the first embodiment. FIG. 1 presents the second embodiment as the first embodiment.

Specifically, the radio-based timer unit (153) is internally equipped with a precision radio wave receiver which automatically receives "standard time" radios from worldwide base stations, calibrating a timer for its time and calendar; the time corrector unit (16) is a trigger component enabled by a button, an ordinary switch or a touch switch; the electrical storage unit (17) stores some electric energy temporarily with the interconnection interface (14) and the equipment (20) electrically connected to each other and discharges the energy for timer calibration.

For execution and operation of the safety navigation device, please refer to FIG. 3, a schematic view illustrating a safety navigation device in the second embodiment, and FIG. 5, a flow diagram illustrating a first executing method of a safety navigation device in the second embodiment. FIGS. 3 and 5 present steps to execute the safety navigation device: a time corrector unit (16) in an integrated circuit module (10) is pushed and pressed for calibration of a radio-based timer unit (153) (pre-step: 300); an interconnection interface (14) of the integrated circuit module (10) is inserted into a slot (21) of equipment (20) (Step 1: 301); the integrated circuit module (10) and the equipment (20) are electrically connected to each other (Step 2: 302); a human interface device module (131) of a control element (13) in the integrated circuit module (10) under a keypad mode is electrically connected to the equipment (20) (Step 3: 303); an IP address (151) is generated by a serial generation unit (15) (Step 4: 304); the IP address (151) is created with a default IP address (121) in a memory chip (12) followed by a time-based serial number, which is generated by an arithmetic formula (122) as well as the radio-based timer unit (153) and read by an algorithm element (152) in the serial generation unit (15) (Step 4-2: 3042); an automated key-in module (132) in the control element (13) issues one command to activate a specific browser (Step 5: 305); the automated key-in module (132) issues a specific key-in command in order to make the specific browser's address bar available (Step 5-1: 3051); the automated key-in module (132) enters the IP address (151) into the address bar to link a website corresponding to the IP address (151) (Step 6: 306); a server (30) dominating the IP address (151)

depends on a certification unit (31) to read corresponding data (32) referring to the IP address (151) and respond the equipment (20) with relevant information (Step 7: 307).

Figure 7:
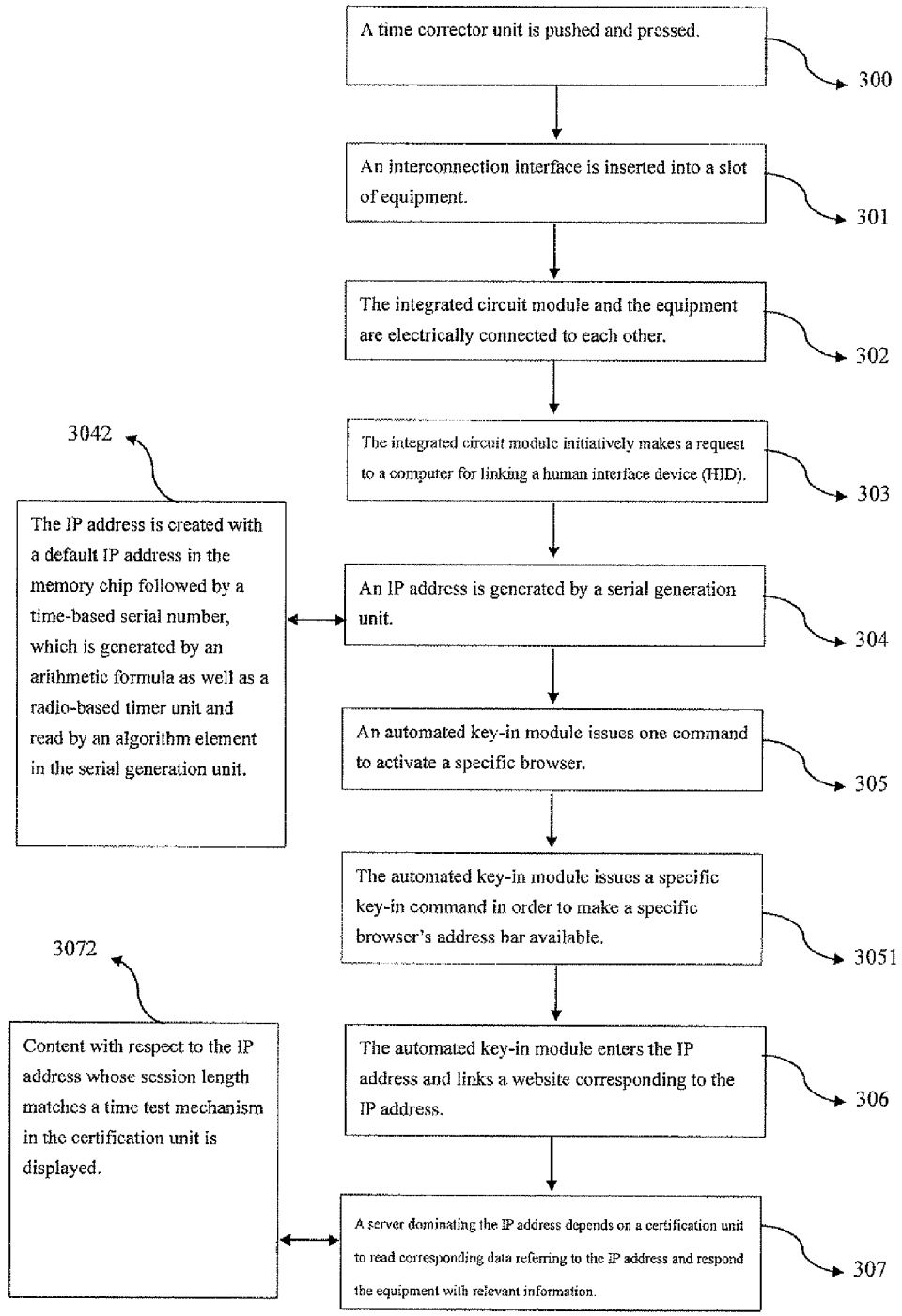
FIG. 7 is a flow diagram illustrating a second executing method of a safety navigation device in the second embodiment.

Please refer to FIG. 7 again. Preferably, the content with respect to the IP address (151) whose session length matches a time test mechanism in the certification unit (31) in Step 7 (307) is displayed (Step 7-2: 3072). Step 7-2 is intended to prevent an IP address which has existed and been used from repeated usage.

Figure 9:
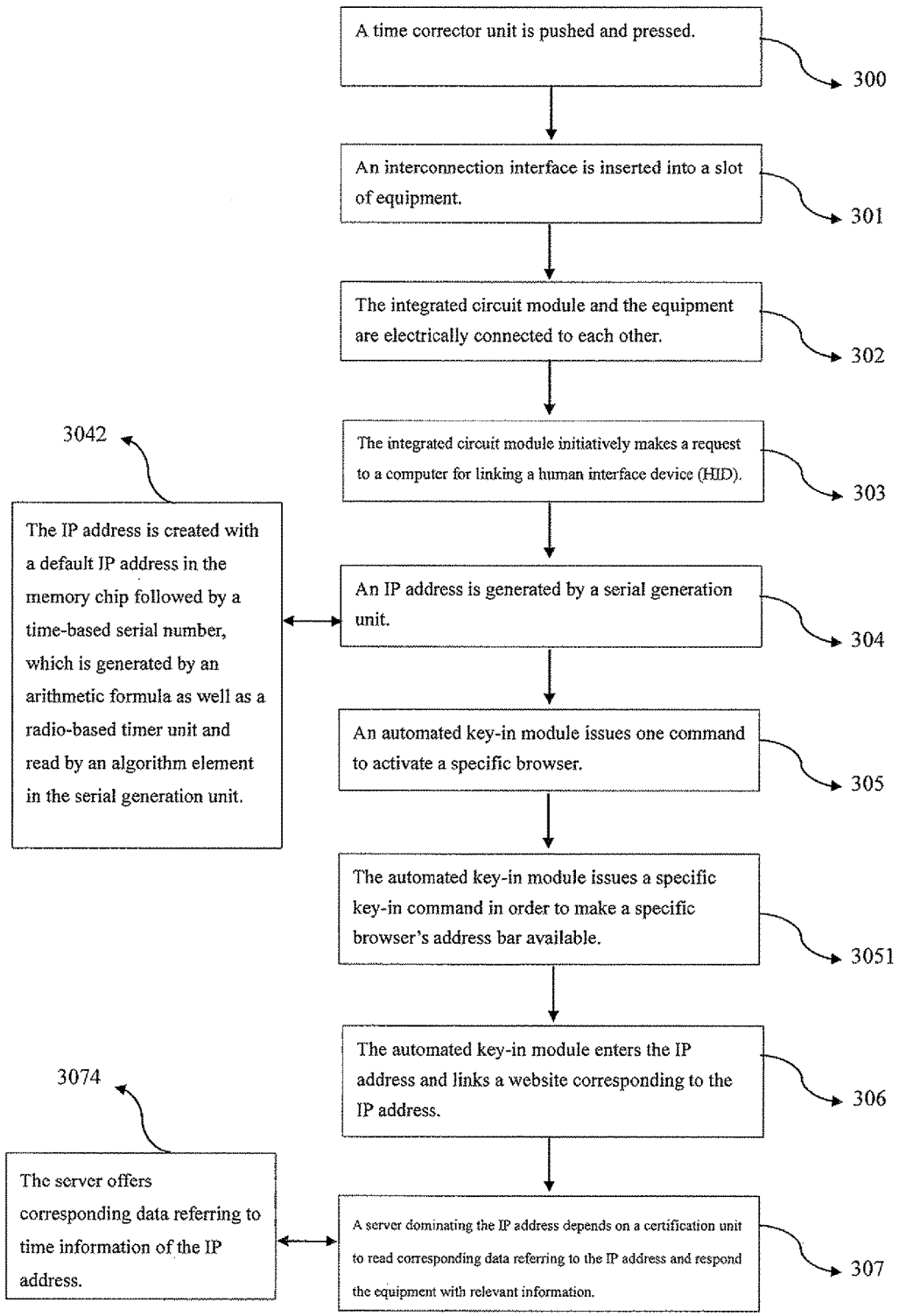
FIG. 9 is a flow diagram illustrating a third executing method of a safety navigation device in the second embodiment.

As shown in FIG. 9, the server (20) in Step 7 (307) offers the corresponding data (32) referring to time information of the IP address (151) (Step 7-4: 3074). As such, information displayed by referring to different time conditions provides an end user more values of the safety navigation device, reducing purchase costs.

Therefore, a safety navigation device in the present disclosure, which has features different from a conventional navigation device and referred to as creative work due to a USB application, meets patentability and is applied for the patent.

It should be reiterated that the above descriptions presents preferred embodiments, and any equivalent change in specifications, claims, or drawings still belongs to the technical field within the present disclosure with reference to claims hereinafter.

What is claimed is:

1. A safety navigation device, comprising:
   an integrated circuit module (10) with:
   a memory chip (12) for saving a default IP address (121) and an arithmetic formula ((122),
   a control element (13) that includes a human interface device module (131) and an automated key-in module (132),
   an interconnection interface (14),
   a serial generation unit (15) that includes an algorithm element (152), a radio-based timer unit (153), a time corrector unit (16) and an electrical storage unit (17), all of which are electrically connected to each other via said integrated circuit module (10) on a substrate (11) that develops two surfaces, an outer surface (111) for installation of said interconnection interface (14) and an inner surface (112) for installation of other components;
   wherein the time corrector unit (16) is a trigger component enabled by a button, an ordinary switch or a touch switch,
   wherein said interconnection interface (14) is inserted into a slot (21) in equipment (20); said control element (13) is adapted to depend on the human interface device module (131) in a keypad mode to be electrically connected to said equipment (20); said serial generation unit (15) is adapted to create another IP address (151); said control element (13) is adapted to issue a signal for entering said another IP address (151) from the automated key-in module (132) to said equipment (20); said equipment (20) links a website corresponding to said another IP address (151); and a certification unit (31) in a server (30) dominating said another IP address (151) is adapted to read corresponding IP address data (32) in said server (30) and to respond to said equipment (20) with relevant IP address validation information that refers to time information of the IP address.

2. An executing method of a safety navigation device, the safety navigation device including a time corrector unit in said integrated circuit module, comprising:
   Step 1: after pushing or pressing the time corrector unit for time calibration of a radio-based timer unit (153), an interconnection interface of an integrated circuit module (10) having a memory chip (12) is inserted into a slot of equipment (301);
   Step 2: the integrated circuit module and the equipment are electrically connected to each other (302);
   Step 3: a human interface device module of a control element in the integrated circuit module initiatively makes a request to a computer for linking a human interface device (HID) (303);
   Step 4: an IP address is generated by a serial generation unit in the integrated circuit module (304);
   Step 5: an automated key-in module in the control element issues one command to activate a specific browser (305);
   Step 6: the automated key-in module enters the IP address into an address bar and links a website corresponding to the IP address (306);
   Step 7: a server dominating the IP address offers the corresponding data (32) referring to time information of the IP address to an end user, the time information being displayed by referring to different time conditions.

3. An executing method of a safety navigation device according to claim 2 characterized in that said IP address is created with a default IP address in said memory chip followed by a serial number, which is generated by an arithmetic formula in said serial generation unit and read by an algorithm element in said serial generation unit, in Step 4 (3041).

4. An executing method of a safety navigation device according to claim 2 characterized in that said IP address is created with a default IP address in said memory chip followed by a time-based serial number, which is generated by an arithmetic formula as well as said radio-based timer unit and read by an algorithm element in said serial generation unit, in Step 4 (3042).

5. An executing method of a safety navigation device according to claim 2 characterized in that said automated key-in module issues a specific key-in command in order to make a specific browser's address bar available after Step 5 (3051).

6. An executing method of a safety navigation device, comprising:
   Step 1: an interconnection interface of an integrated circuit module (10) is inserted into a slot of equipment (301);
   Step 2: the integrated circuit module and the equipment are electrically connected to each other (302);
   Step 3: a human interface device module of a control element in the integrated circuit module initiatively makes a request to a computer for linking a human interface device (HID) (303);
   Step 4: an IP address is generated by a serial generation unit in the integrated circuit module (304);
   Step 5: an automated key-in module in the control element issues one command to activate a specific browser (305);
   Step 6: the automated key-in module enters the IP address into an address bar and links a website corresponding to the IP address (306);
   Step 7: a server dominating the IP address offers the corresponding data (32) referring to time information of the IP address to an end user, the time information being displayed by referring to different time conditions; and Step 8: content with respect to said IP address, which has been recorded in said server in Step 7 according to data logging but is still inactivated, is displayed (308).

7. An executing method of a safety navigation device according to claim 2 characterized in that content with respect to said IP address whose session length matches a time test mechanism in said certification unit in Step 7 is displayed (3071).

8. An executing method of a safety navigation device according to claim 2 characterized in that said server offers said corresponding data referring to time information of the IP address (3073).

9. A safety navigation device, comprising:
   an integrated circuit module (10) with:
   a memory chip (12) for saving a default IP address (121) and an arithmetic formula ((122),
   a control element (13) that includes a human interface device module (131) and an automated key-in module (132),
   an interconnection interface (14),
   a serial generation unit (15) that includes an algorithm element (152), a radio-based timer unit (153), a time corrector unit (16) and an electrical storage unit (17), all of which are electrically connected to each other via said integrated circuit module (10) on a substrate (11) that develops two surfaces, an outer surface (111) for installation of said interconnection interface (14) and an inner surface (112) for installation of other components;
   wherein the electrical storage unit (17) stores some electric energy temporarily with the interconnection interface (14) and the equipment (20), which are electrically connected to each other, and discharges the energy for timer calibration, and
   wherein said interconnection interface (14) is inserted into a slot (21) in equipment (20); said control element (13) is adapted to depend on the human interface device module (131) in a keypad mode to be electrically connected to said equipment (20); said serial generation unit (15) is adapted to create another IP address (151); said control element (13) is adapted to issue a signal for entering said another IP address (151) from the automated key-in module (132) to said equipment (20); said equipment (20) links a website corresponding to said another IP address (151); and a certification unit (31) in a server (30) dominating said another IP address (151) is adapted to read corresponding IP address data (32) in said server (30) and to respond to said equipment (20) with relevant IP address validation information that refers to time information of the IP address.

* * * * *